United States Patent
Wu et al.

(10) Patent No.: US 10,803,654 B2
(45) Date of Patent: Oct. 13, 2020

(54) THREE-DIMENSIONAL HUMAN FACE RECONSTRUCTION METHOD

(71) Applicant: National Chiao Tung University, Hsinchu (TW)

(72) Inventors: Bing-Fei Wu, Hsinchu (TW); Chun-Hsien Lin, Hsinchu (TW); Yi-Chiao Wu, Hsinchu (TW); Bing-Jhang Wu, Hsinchu (TW); Chih-Cheng Huang, Hsinchu (TW); Meng-Liang Chung, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/578,450

(22) Filed: Sep. 23, 2019

(65) Prior Publication Data

US 2020/0167990 A1    May 28, 2020

(30) Foreign Application Priority Data

Nov. 27, 2018  (TW) .............. 107142148 A

(51) Int. Cl.
*G06T 15/20* (2011.01)
*G06K 9/00* (2006.01)

(52) U.S. Cl.
CPC ........ *G06T 15/205* (2013.01); *G06K 9/00214* (2013.01); *G06K 9/00255* (2013.01); *G06K 9/00288* (2013.01); *G06K 9/00302* (2013.01); *G06K 2009/00328* (2013.01)

(58) Field of Classification Search
CPC .............. G06T 15/205; G06K 9/00214; G06K 9/00255; G06K 9/00288; G06K 9/00302
USPC ........................................................ 345/419
See application file for complete search history.

(56) References Cited

U.S. PATENT DOCUMENTS

| | | | |
|---|---|---|---|
| 2004/0263456 A1* | 12/2004 | Miyachi ............... | G09G 3/3607 345/88 |
| 2016/0379041 A1* | 12/2016 | Rhee ....................... | G06T 19/20 382/118 |
| 2017/0316598 A1* | 11/2017 | Wang .................. | G06K 9/00281 |

* cited by examiner

*Primary Examiner* — Hai Tao Sun
(74) *Attorney, Agent, or Firm* — Bacon & Thomas, PLLC

(57) ABSTRACT

The invention is related to a method of three-dimensional face reconstruction by inputting a single face image to reconstruct a three-dimensional face model, therefore, the human face image is seen at various angles of three-dimensional face through rotating the model images.

16 Claims, 4 Drawing Sheets

THREE-DIMENSIONAL HUMAN FACE RECONSTRUCTION METHOD

BACKGROUND OF THE INVENTION

1. Field of the Invention

The invention is related to a method of three-dimensional face reconstruction, particularly to a method by inputting a single two-dimensional face image to reconstruct a three-dimensional face model, more particularly to the human face image is seen at various angles of three-dimensional face through rotating the model images.

2. Description of the Prior Art

In recent years, three-dimensional face modeling and reconstruction technique had been paid more attention in the computer vision field and computer graphics field. In the previous relevant technical development, most technical development proposed the algorithm of how to reconstruct the three-dimensional graphic by two-dimensional graphic, in order to simulate the modeling and reconstructing of three-dimensional human face. It was the major technical development direction in the related field over the past.

In the algorithm of prior art, it always needs several graphics or several video images to carry on the initialization of three-dimensional human face reconstruction. However, under a lot of application occasions, only a two-dimensional image can be obtained for use often. In some computation and simulation methods, although only a single image is used for carrying on three-dimensional human face reconstruction, but the obtained three-dimensional human face is unable to produce the lifelike result. And the obtained three-dimensional human face can only have a particular angle (because only a two-dimensional image is provided), it is even unable to provide three-dimensional human face image with various angles.

In addition, some previous studies proposed more accurate three-dimensional human face algorithms. In a plurality of studies, the fitting of whole human face was carried on first. Then some particular areas were fitted, such as eyes, mouth and nose. However, because it needed to take longer computing time, and was unable to produce the accurate fitting result, therefore it was difficult to put into practical application. It was unable to accord with the demand of industry.

Thus, the industry needs a method of three-dimensional human face reconstruction by inputting a single two-dimensional face image to reconstruct a three-dimensional human face. It will be able to take less time, namely to reconstruct three-dimensional human face in quicker time and more accurate way.

SUMMARY OF THE INVENTION

One of the purposes of the invention is to provide a method of three-dimensional (3D) face reconstruction by inputting a single two-dimensional (2D) face image to reconstruct a three-dimensional face model, so that the human face image can be seen at various angles of three-dimensional face through rotating the model images.

One of the purposes of the invention is to provide a method of three-dimensional face reconstruction by using the two-dimensional feature points to convert the three-dimensional coordinates, estimate the human face turn, finely tune the shape, and compensate the color, reconstruct a three-dimensional face model, in order to obtain a rotatable three-dimensional face image. Namely, by inputting a single two-dimensional face image to reconstruct a three-dimensional face model, which can be seen at various angles of three-dimensional face through rotating the model images.

In order to achieve the abovementioned purpose, the invention provides a three-dimensional human face reconstruction method, comprising: inputting a two-dimensional face image first, treating the two-dimensional face image by the neural network model, positioning the two-dimensional feature points for the two-dimensional face image, obtaining a plurality of two-dimensional feature point positions for the two-dimensional face image; converting the plurality of two-dimensional feature points into a plurality of three-dimensional coordinates; converting the plurality of two-dimensional feature points into the corresponding the plurality of three-dimensional coordinates in accordance with the approximate computing, forming the plurality of three-dimensional coordinates to a first (i.e. average) three-dimensional face model; finely tuning the three-dimensional face shape of the first (i.e. average) three-dimensional face model. Namely, repeating a multi-stage computing from the low resolution to the high resolution, to obtain a second three-dimensional face model; compensating the face color of the second three-dimensional face model, to obtain a third three-dimensional face model; outputting a three-dimensional face image in accordance with the third three-dimensional face model.

In an embodiment of the invention, the third three-dimensional face model is a color three-dimensional face model. It is noted particularly that every stage of three-dimensional face model is the color face model.

In an embodiment of the invention, the first three-dimensional face variable model uses an average model as the basis, which adopts the linear combination of the plurality of feature templates to form a model differentiating from the first three-dimensional face model. The second three-dimensional face variable model uses an average model as the basis, which adopts the linear combination of the plurality of feature templates to form a model differentiating from the second three-dimensional face model.

In an embodiment of the invention, the first (i.e. average) three-dimensional face variable model and the second three-dimensional face model are multi-stage resolution three-dimensional face variable models, which can be computed from lowest resolution to highest resolution, to obtain the first three-dimensional face variable model and the second three-dimensional face model.

In an embodiment of the invention, after achieving the abovementioned steps of "converting the two-dimensional feature points into the three-dimensional feature points", carrying on the shape fine tuning for the average model of the obtained three-dimensional feature points. The average model herein is extracted from a three-dimensional face database to form an average three-dimensional face variable model. The shape fine tuning of three-dimensional face model adopts the linear combination of the plurality of feature templates, to carry on the simulated adjustment in computing repeatedly multiple stages from low resolution face model to high resolution face model, in order for expecting to reduce the computing amount and time.

In an embodiment of the invention, the steps for carrying on the fine tuning of the first three-dimensional face model of a three-dimensional face shape are adopted. The Newton method is adopted to obtain a first stage three-dimensional variable model projecting to a point on the two-dimensional plane, which is closest to a two-dimensional feature point for obtaining a three-dimensional rotation matrix, a two-dimensional deviation amount, a focus and a three-dimensional variable model parameter, to obtain a first stage three-dimensional face model.

In an embodiment of the invention, the steps for carrying on the fine tuning of the first three-dimensional face model of a three-dimensional face shape are adopted. When the resolution is the second stage, wherein the three-dimensional rotation matrix, two-dimensional deviation amount, focus and three-dimensional variable model parameter are mapped to the second stage three-dimensional variable model. The second stage three-dimensional variable model is projected to the point on two-dimensional plane for computing a deviation value closest to the image profile point. The deviation value is adopted to adjust the three-dimensional variable model parameters.

In an embodiment of the invention, the steps for carrying on the fine tuning of the first three-dimensional face model of a three-dimensional face shape are adopted, comprising when the resolution is above the second stage, the three-dimensional rotation matrix, two-dimensional deviation amount, focus, deviation value of image profile point, position of two-dimensional feature points, deviation value of color projection and three-dimensional variable model parameter are mapped to a second stage three-dimensional variable model, to compute for projecting the second stage three-dimensional variable model to the point on two-dimensional plane.

In an embodiment of the invention, the steps for carrying on the fine tuning of the first three-dimensional face model of a three-dimensional face shape are adopted, comprising when the resolution is the Nth stage, the three-dimensional rotation matrix, two-dimensional deviation amount, focus and three-dimensional variable model parameter are serially mapped to a second stage three-dimensional variable model, a second stage three-dimensional variable model until a (N–1)th three-dimensional variable model. The (N–1)th stage three-dimensional variable model is projected to the point on two-dimensional plane for repeatedly computing a deviation value closest to the image profile point. The deviation value is adopted to adjust the three-dimensional variable model parameters. The abovementioned deviation value should be less than the predetermined deviation value. Thus, when the resolution is over the second stage, except the abovementioned "deviation value of image profile point", the "position of two-dimensional feature points" and "deviation value of color projection" can also be adopted to carry on the fine tuning of three-dimensional face shape.

In order to let the abovementioned purposes, characteristics and advantages of the invention can be understood much more obviously, the following embodiments and the Figures are attached for detailed description as follows.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The abovementioned and other technical contents, characteristics and performance of the invention can by present clearly in the detailed description of a preferred embodiment through cooperating with the description of the figures.

Figure 1:
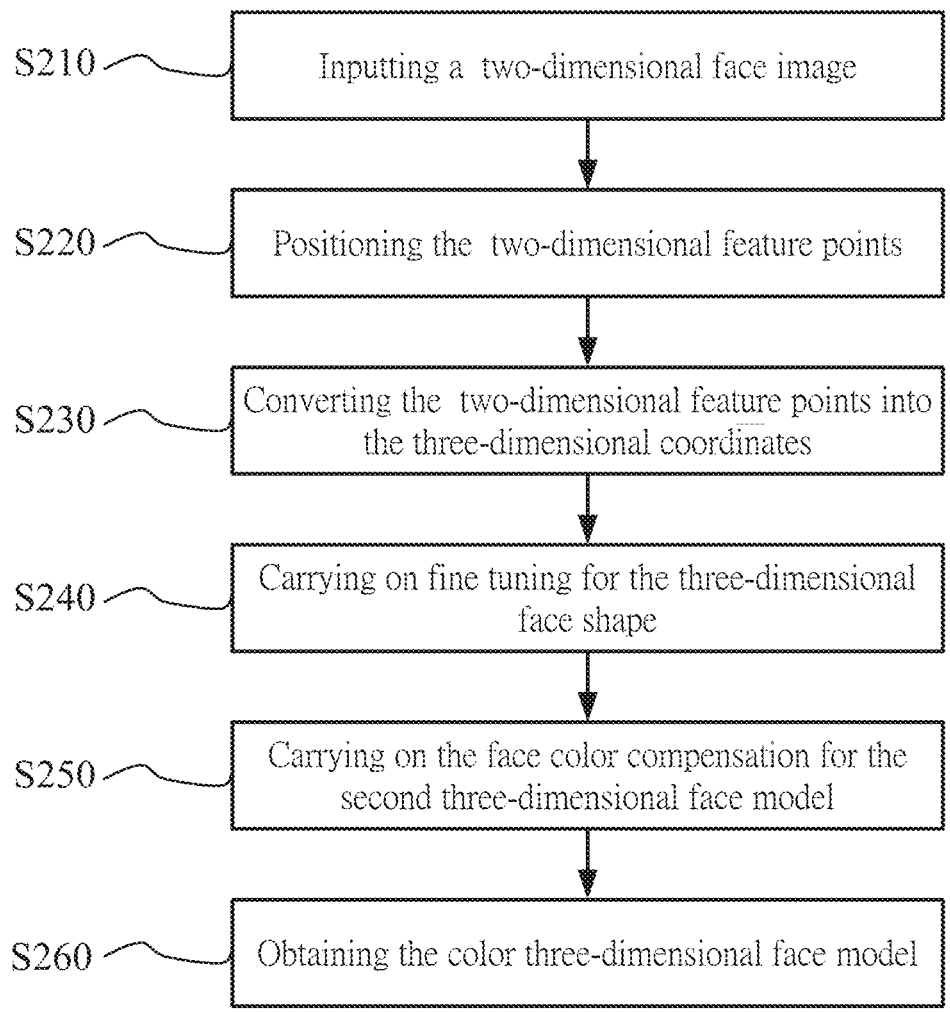
FIG. 1 illustrates an embodiment for the three-dimensional human face reconstruction method of the invention.
Figure 2:
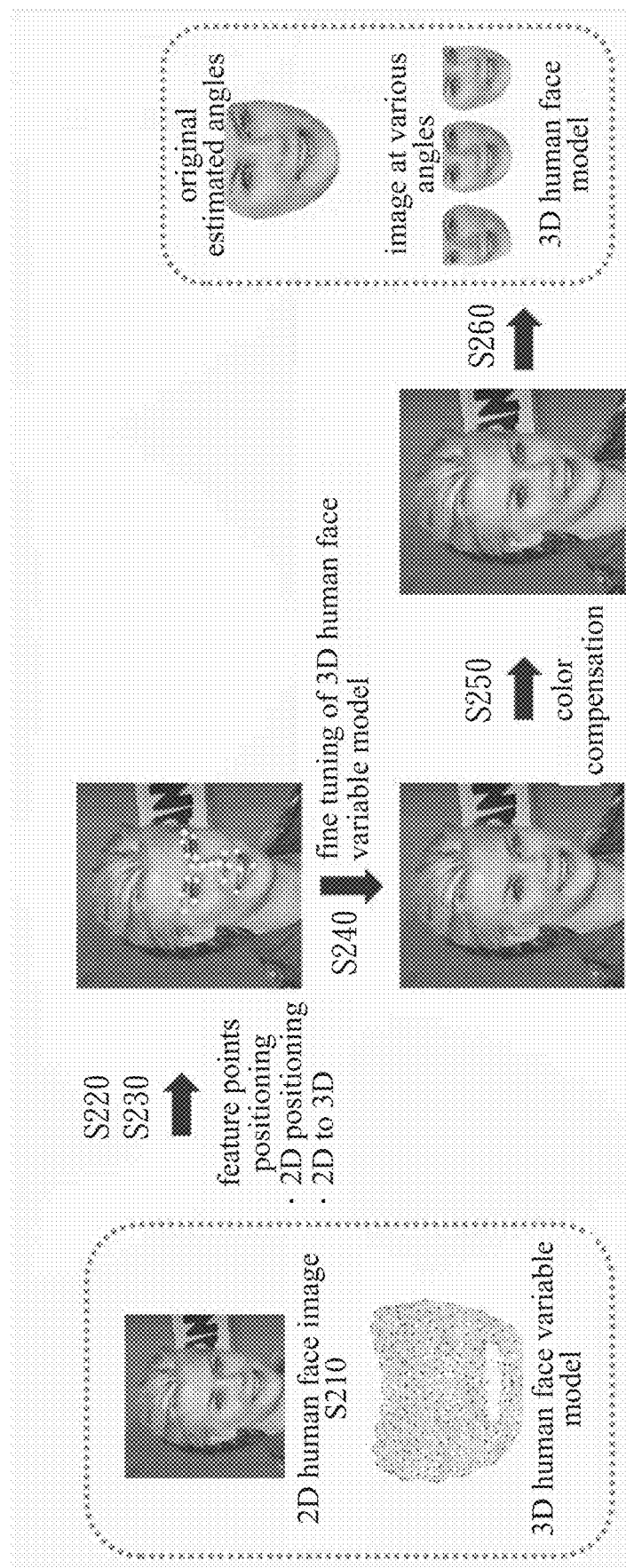
FIG. 2 illustrates the diagram for the three-dimensional human face reconstruction method of the invention.

Please refer to FIG. 1 and FIG. 2. FIG. 1 illustrates an embodiment for the three-dimensional (3D) human face reconstruction method of the invention. FIG. 2 illustrates the diagram for the three-dimensional (3D) human face reconstruction method of the invention. Please refer to FIG. 1, the three-dimensional human face reconstruction method of the invention includes the following steps:

First of all, please refer to Step S210 in FIG. 1, inputting a two-dimensional (2D) face image.

Furthermore, refer to Step S220 in FIG. 1, positioning the two-dimensional feature points 200 for the two-dimensional face image. As shown in FIG. 2, the two-dimensional face key points (such as the eyes, nose and mouth etc.) are positioned by the face alignment method.

Figure 3:
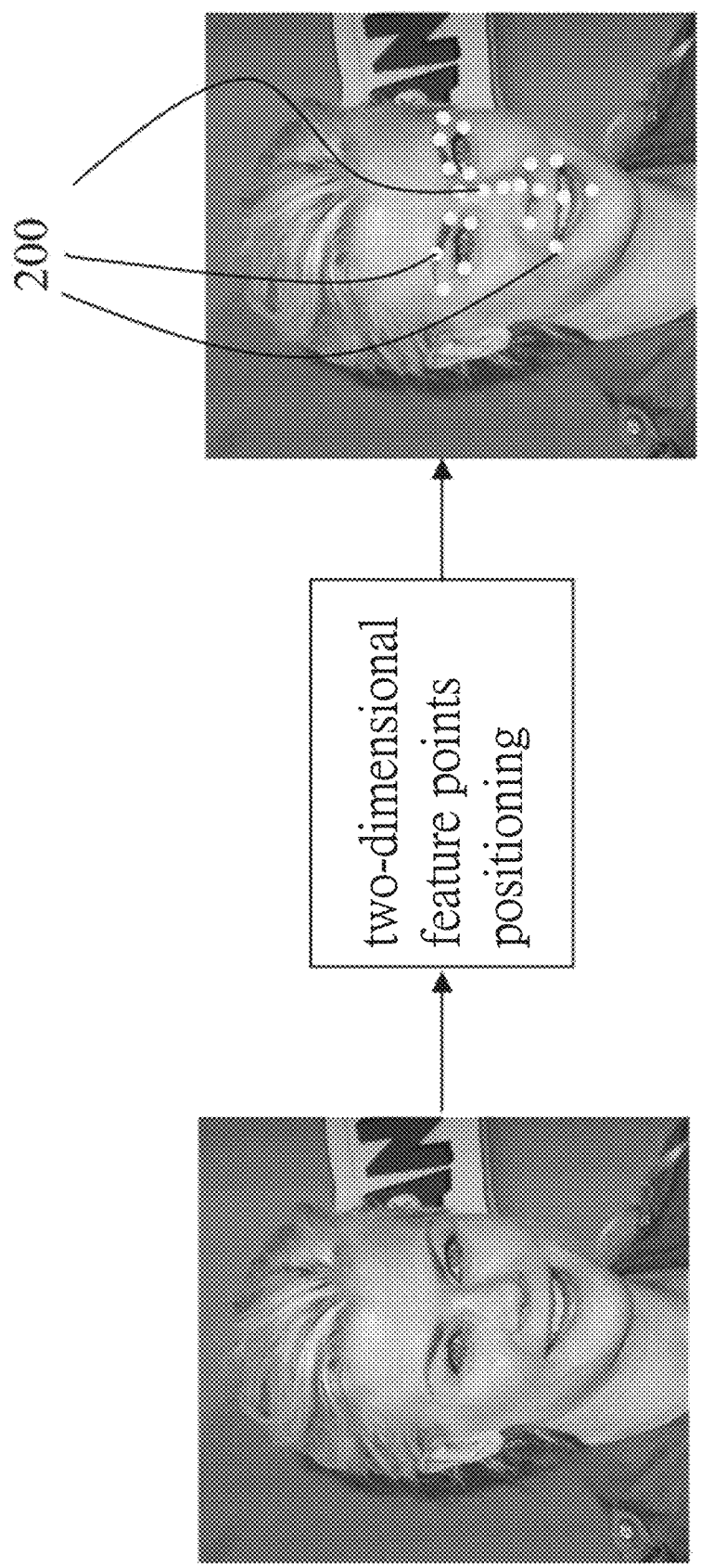
FIG. 3 illustrates the positioning diagram of the two-dimensional feature points.

Please refer to FIG. 3. FIG. 3 illustrates the positioning diagram of the two-dimensional feature points. As shown in FIG. 3, inputting a two-dimensional face image to a rotation neural network model. The rotation neural network model is adopted to treat the two-dimensional face image for positioning the two-dimensional face image and outputting a plurality of two-dimensional feature points 200.

Please refer to Step S230 in FIG. 1, converting the plurality of two-dimensional feature points 200 into a plurality of three-dimensional coordinates; converting the plurality of two-dimensional feature points 200 into the corresponding the plurality of three-dimensional (3D) coordinates in accordance with the approximate computing, forming the plurality of three-dimensional coordinates to a first (average) three-dimensional face model.

In an embodiment of the invention, please refer to the following method for computing the first (average) three-dimensional face model. The Newton method is adopted to obtain an optimized value function (obtaining a first stage three-dimensional variable model projecting to a point on the two-dimensional plane, which is closest to a two-dimensional feature point 200) for obtaining a three-dimensional rotation matrix, a two-dimensional deviation amount, a focus and a three-dimensional variable model parameter, to obtain a first stage (average) three-dimensional face model.

Furthermore, please refer to Step S240 in FIG. 1, carrying on the shape fine tuning for the first (average) three-dimensional face model, to obtain a second three-dimensional face model. Through the key points and face image information, adjusting the parameters of three-dimensional face variable model, such as the parameters of model rotating, scaling and shifting etc., therefore the three-dimensional face variable model can comply with the two-dimensional face image as practical as possible.

Furthermore, please still refer to Step S230 in FIG. 1, in the Step of converting the plurality of two-dimensional feature points into a plurality of three-dimensional coordinates, carrying on the fine tuning for the three-dimensional face shape of the first three-dimensional face model. As in Step S240, the first three-dimensional face model is extracted from a three-dimensional face database to form a first three-dimensional face variable model. The first three-dimensional face variable model uses an average model as the basis, which adopts the linear combination of the plurality of feature templates to form a model differentiating from the first three-dimensional face model. The second three-dimensional face variable model uses an average model as the basis, which adopts the linear combination of the plurality of feature templates to form a model differentiating from the second three-dimensional face model. Thus, in an embodiment of the invention, the steps for carrying on the fine tuning of the first three-dimensional face model of a three-dimensional face shape are adopted. When the resolution is the second stage, the three-dimensional rotation matrix, two-dimensional deviation amount, focus and three-dimensional variable model parameter are mapped to the second stage three-dimensional variable model. The second stage three-dimensional variable model is projected to the point on two-dimensional plane for computing a deviation value closest to the image profile point. The deviation value is adopted to adjust the three-dimensional variable model parameters. In the abovementioned embodiment, the steps for carrying on the fine tuning of the first three-dimensional face model of a three-dimensional face shape are adopted, comprising when the resolution is above the second stage, the three-dimensional rotation matrix, two-dimensional deviation amount, focus, deviation value of image profile point, position of two-dimensional feature points, deviation value of color projection and three-dimensional variable model parameter are mapped to a second stage three-dimensional variable model, to compute for projecting the second stage three-dimensional variable model to the point on two-dimensional plane.

Figure 4:
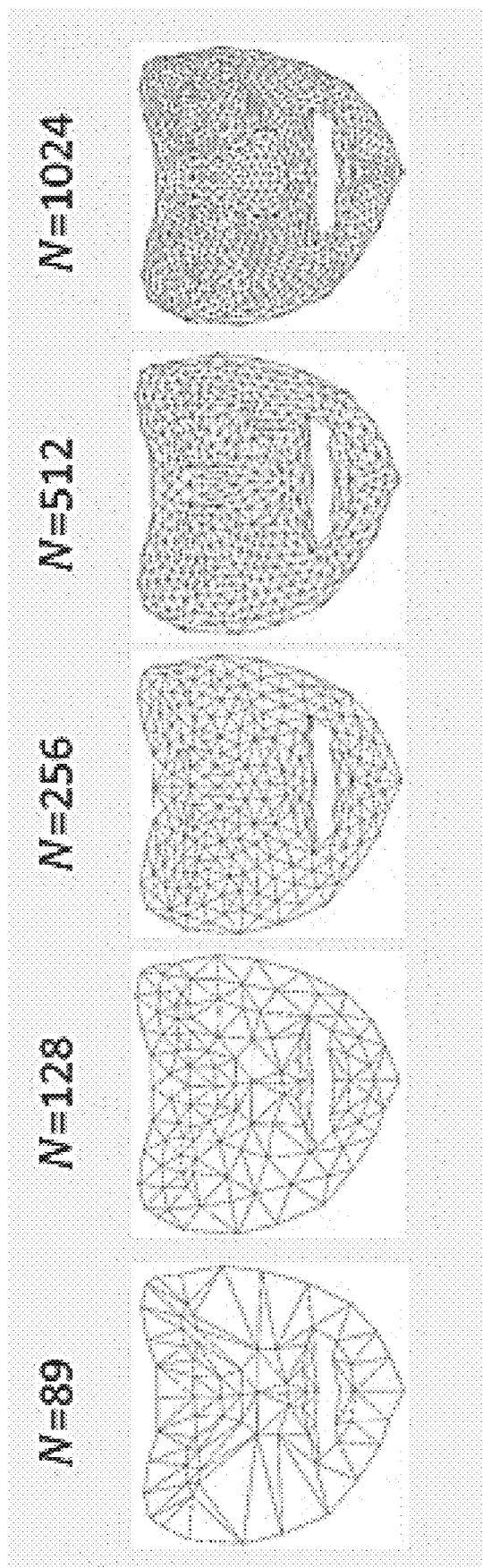
FIG. 4 illustrates a fifth stage resolution diagram for a multiple resolution three-dimensional face variable model of the invention.

Please refer to FIG. 4, the first three-dimensional face variable model and the second three-dimensional face model are multi-stage resolution three-dimensional face variable models, which can be computed from lowest resolution to highest resolution, to obtain the first three-dimensional face variable model and the second three-dimensional face model. In order to accelerate the computing treatment, converting the multi-stage resolution three-dimensional face variable model into a multi-stage resolution three-dimensional face variable model (depending on N) through the computing analysis from the low resolution to the high resolution. In which, the low resolution has less first three-dimensional face model points, and the high resolution has more first three-dimensional face model points.

Please refer to FIG. 4, through the abovementioned cycle, treating the computing to the last stage resolution to obtain a three-dimensional face model similar to the two-dimensional face image.

It is noted in the embodiment, when the resolution is the fifth stage, through the abovementioned cycle, carrying on the computing till the fifth stage resolution to obtain a three-dimensional face model similar to the two-dimensional face image. Namely, the multi-stage resolution three-dimensional face variable models include the three-dimensional face variable model from the first to above fifth stage resolution. In which, the fine tuning for a three-dimensional face model of the first three-dimensional face model includes a repeatedly multi-stage computing for a three-dimensional face shape of the first three-dimensional face model from low resolution to high resolution.

In another embodiment of the invention, when the resolution is the Nth stage, wherein the three-dimensional rotation matrix, two-dimensional deviation amount, focus and three-dimensional variable model parameter are serially mapped to a second stage three-dimensional variable model, a second stage three-dimensional variable model until a (N−1)th three-dimensional variable model. The (N−1)th stage three-dimensional variable model is projected to the point on two-dimensional plane for repeatedly computing a deviation value closest to the image profile point. The deviation value is adopted to adjust the three-dimensional variable model parameters.

Please refer to Step S260 in FIG. 1, outputting a three-dimensional face image in accordance with the third three-dimensional face model.

In an embodiment of the invention, after finishing the abovementioned steps of "converting the two-dimensional (2D) feature points into the three-dimensional (3D) feature points", carrying on the shape fine tuning for the average model of the obtained three-dimensional feature points. The average model herein is extracted from a three-dimensional face database to form an average three-dimensional face variable model. The shape fine tuning of three-dimensional face model adopts the linear combination of the plurality of feature templates, to carry on the simulated adjustment in multiple computing stages from low resolution face model to high resolution face model, in order for expecting to reduce the computing amount and time.

According to the abovementioned description, the method of three-dimensional human face reconstruction provided by the invention can restrict a three-dimensional face image by inputting a single two-dimensional face image. The three-dimensional face model in the three-dimensional face image can be rotated to get various angles, and further get the three-dimensional face image which can be seen at various angles. Namely, reconstructing a three-dimensional face image with various rotating angles by inputting a single two-dimensional face image.

It is understood that various other modifications will be apparent to and can be readily made by those skilled in the art without departing from the scope and spirit of the invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the invention pertains.

What is claimed is:

1. A method of three-dimensional human face reconstruction, comprising
inputting a two-dimensional face image;
positioning, by a positioning method comprising a neural network model, said two-dimensional feature points for said two-dimensional face image, obtaining a plurality of two-dimensional feature point positions for said two-dimensional face image;
converting said plurality of two-dimensional feature points into a plurality of three-dimensional coordinates, and converting said plurality of two-dimensional feature points into a corresponding said plurality of three-dimensional coordinates in accordance with an approximate computing, forming said plurality of three-dimensional coordinates to a first three-dimensional face model;
finely tuning a three-dimensional face shape of said first three-dimensional face model, in order to obtain a second three-dimensional face model;
compensating a face color of said second three-dimensional face model, in order to obtain a third three-dimensional face model; and outputting a three-dimensional face image in accordance with said third three-dimensional face model,
    wherein upon converting the plurality of two-dimensional feature points into a plurality of three-dimensional coordinates and finely tuning a three-dimensional face shape of the first three-dimensional face model, the first three-dimensional face model adopting a three-dimensional face database to form the first three-dimensional face variable model through main component analysis, and the second three-dimensional face model adopts the three-dimensional face database to form the second three-dimensional face variable model through main component analysis, and
    wherein the first three-dimensional face variable model uses an average model as the basis, which adopting the linear combination of the plurality of feature templates to form a model differentiating from the first three-dimensional face model, wherein, the second three-dimensional face variable model using an average model as the basis, which adopts the linear combination of the plurality of feature templates to form a model differentiating from the second three-dimensional face model.

2. The three-dimensional human face reconstruction method according to claim 1, wherein the three-dimensional face model comprises a color three-dimensional face model.

3. The three-dimensional human face reconstruction method according to claim 1, wherein the first three-dimensional face variable model and the second three-dimensional face model are multi-stage resolution three-dimensional face variable models, which being computed from lowest resolution to highest resolution, to obtain the first three-dimensional face variable model and the second three-dimensional face model.

4. The three-dimensional human face reconstruction method according to claim 3, wherein the multi-stage resolution three-dimensional face variable models comprises the three-dimensional face variable model from the first to above fifth stage resolution.

5. The three-dimensional human face reconstruction method according to claim 1, wherein upon carrying on the color compensation for the second three-dimensional face model, three arbitrary pointing on the second three-dimensional face model being used to form a face of a triangle, computing to see if the normal vector of every triangle faces outwards, in order to judge whether to fill the color on that face.

6. The three-dimensional human face reconstruction method according to claim 5, when the normal vector of the triangle faces outwards, it being judged that these three points being visible without been shielded, the second three-dimensional face model being projected to the two-dimensional plane in accordance with the coordinate of the two-dimensional plane to find out the corresponding color value, and patch back the color value to the second three-dimensional face model.

7. The three-dimensional human face reconstruction method according to claim 5, when the normal vector of the triangle faces inwards, it is judged that these three points being invisible with been shielded, and these three points being rear face.

8. The three-dimensional human face reconstruction method according to claim 6, after the color being filled, the average color value and the standard deviation being calculated, if the average value being over a predetermined value, wherein the corresponding color on the two-dimensional plane being not considered as the color of these three points, the interpolated color of surrounding color is filled.

9. The three-dimensional human face reconstruction method according to claim 1, wherein the steps for carrying on the fine tuning of the first three-dimensional face model of a three-dimensional face shape being adopted, the Newton method being adopted to get a first stage three-dimensional variable model projecting to a point on the two-dimensional plane, which being closest to a two-dimensional feature point for obtaining a three-dimensional rotation matrix, a two-dimensional deviation amount, a focus and a three-dimensional variable model parameter, to obtain a first stage three-dimensional face model.

10. The three-dimensional human face reconstruction method according to claim 9, wherein the steps for carrying on the fine tuning of the first three-dimensional face model of a three-dimensional face shape are adopted, when the resolution being the second stage, the three-dimensional rotation matrix, two-dimensional deviation amount, focus and three-dimensional variable model parameter being mapped to the second stage three-dimensional variable model, the second stage three-dimensional variable model being projected to the point on two-dimensional plane for computing a deviation value closest to the image profile point, the deviation value being adopted to adjust the three-dimensional variable model parameters, wherein the deviation value is less than the predetermined deviation value.

11. The three-dimensional human face reconstruction method according to claim 9, wherein the steps for carrying on the fine tuning of the first three-dimensional face model of a three-dimensional face shape being adopted, comprising when the resolution being above the second stage, wherein the three-dimensional rotation matrix, two-dimensional deviation amount, focus, deviation value of image profile point, position of two-dimensional feature points, deviation value of color projection and three-dimensional variable model parameter are mapped to a second stage three-dimensional variable model, to compute for projecting the second stage three-dimensional variable model to the point on two-dimensional plane.

12. The three-dimensional human face reconstruction method according to claim 9, wherein the steps for carrying on the fine tuning of the first three-dimensional face model of a three-dimensional face shape are adopted, comprising when the resolution being the Nth stage, the three-dimensional rotation matrix, two-dimensional deviation amount, focus and three-dimensional variable model parameter are serially mapped to a second stage three-dimensional variable model, wherein a second stage three-dimensional variable model until a (N−1)th three-dimensional variable model, the (N−1)th stage three-dimensional variable model being projected to the point on two-dimensional plane for repeatedly computing a deviation value closest to the image profile point, the deviation value is adopted to adjust the three-dimensional variable model parameters, wherein the deviation value is less than the predetermined deviation value.

13. The three-dimensional human face reconstruction method according to claim 1, wherein finely tuning a three-dimensional face shape of the first three-dimensional face model includes repeating a multi-stage computing for a three-dimensional face shape of the first three-dimensional face model from the low resolution to the high resolution.

14. The three-dimensional human face reconstruction method according to claim 13, wherein the low resolution has less first three-dimensional face model points.

15. The three-dimensional human face reconstruction method according to claim 13, wherein the high resolution has more first three-dimensional face model points.

16. The three-dimensional human face reconstruction method according to claim 1, wherein the first three-dimensional face model is an average face model.

* * * * *